United States Patent [19]

Hanisch et al.

[11] 4,231,265
[45] Nov. 4, 1980

[54] TOOTH GRIP BELT PULLEY

[75] Inventors: Horst Hanisch, Aidlingen; Heinrich Winkelmann, Ahlen; Adolf Fischer, Haar, all of Fed. Rep. of Germany

[73] Assignee: Winkelmann and Pannhoff and Bayerische Motoren Werke Aktiengesellschaft, Fed. Rep. of Germany

[21] Appl. No.: 859,179

[22] Filed: Dec. 9, 1977

[30] Foreign Application Priority Data

Dec. 9, 1976 [DE] Fed. Rep. of Germany ....... 2655909

[51] Int. Cl.³ ............................................. F16H 55/44
[52] U.S. Cl. ..................................... 474/152; 474/197; 474/180; 474/903
[58] Field of Search ................ 74/230.8, 230.3, 230.4, 74/229, 243 R, 446, 447, 449; 29/159 R, 159.2, 159.3

[56] References Cited

U.S. PATENT DOCUMENTS

| 1,705,931 | 3/1929 | Lewis et al. | 74/449 |
| 1,705,932 | 3/1929 | Lewis et al. | 74/449 |
| 1,705,933 | 3/1929 | Lewis et al. | 74/449 |
| 2,620,675 | 12/1952 | Meadows et al. | 29/159 R |
| 2,724,975 | 11/1955 | Drummond | 74/230.8 |
| 2,729,110 | 1/1956 | Killian et al. | 74/449 |
| 2,875,625 | 3/1959 | Schultz, Jr. | 74/230.8 |
| 3,796,106 | 3/1974 | Fisher et al. | 74/243 R |
| 4,131,032 | 12/1978 | Warland | 74/243 R |

FOREIGN PATENT DOCUMENTS

| 867958 | 12/1941 | France | 29/159.2 |
| 966860 | 10/1950 | France | 29/159.2 |
| 71596 | 5/1944 | Norway | 74/230.8 |

Primary Examiner—Samuel Scott
Assistant Examiner—Lee E. Barrett
Attorney, Agent, or Firm—Craig and Antonelli

[57] ABSTRACT

A tooth grip belt pulley of deformed sheet metal with a hub formed in one piece therewith and constructed pot-shaped; the cylindrical wall of the hub is constructed as an interference seat for a shaft end and the bottom wall thereof as axial abutment for the shaft end; the edge of the hub passes over into webs of the tooth grip belt pulley.

13 Claims, 4 Drawing Figures

U.S. Patent   Nov. 4, 1980   4,231,265
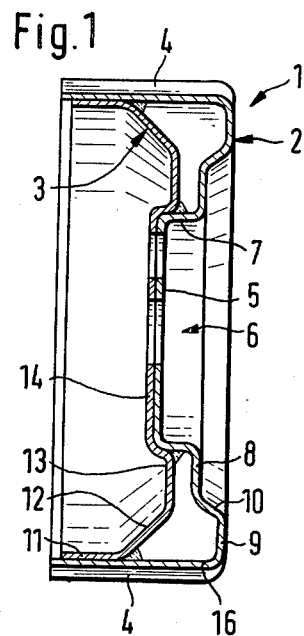
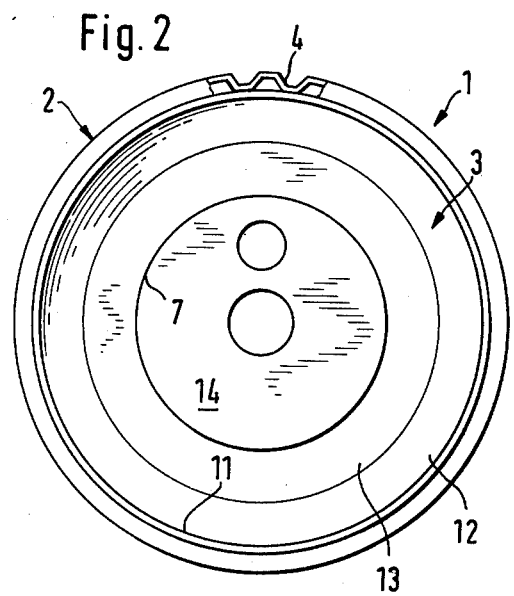
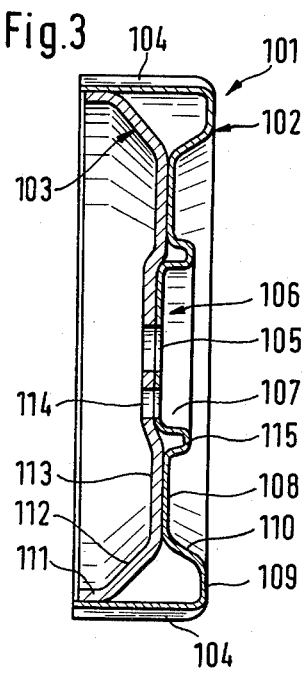
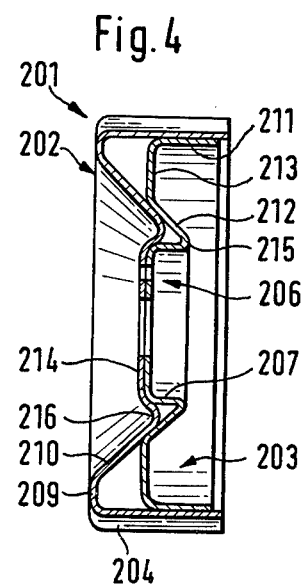

TOOTH GRIP BELT PULLEY

The present invention relates to a tooth grip belt pulley of deformed sheet metal with a hub formed thereon in one piece. It is known from the German Gebrauchsmuster No. 7,301,225 in connection with tooth grip belt pulleys having a particularly small torque transmission to form the hub thereon in one piece. For larger torque transmissions, it is known in the prior art to construct the hub as separate structural part and to connect the same with the toothed rim consisting of sheet metal of the tooth grip belt pulley by way of sheet metal webs or to connect the sheet metal webs with a shaft flange (U.S. Pat. No. 2,729,110). These constructions are very involved and therefore very expensive by reason of the high structural expenditure owing to the hubs and shaft flanges which are to be manufactured separately.

It is the aim of the present invention to so construct the hub formed in one piece with the tooth grip belt pulley that with low manufacturing expenditures and high dimensional accuracy a large torque can be transmitted without non-permissive deformation and with a long life expectancy of the tooth grip belt pulley.

As solution to the underlying problems, the present invention essentially consists in that the hub is constructed pot-shaped, whereby the cylindrical wall thereof is constructed as snug or interference fit for a shaft end and the bottom wall thereof is constructed an axial abutment for the shaft end as well as the edge thereof passes over into the web of the tooth grip belt pulley. As a result of this construction, the tooth grip belt pulley can be fastened on a smooth shaft end with a high dimensional accuracy in the axial, radial and circumferential direction both by being pressed-on as also by a threaded connection by means of a screw or bolt secured in the shaft end and possibly by a fitted bolt for fixing the circumferential position. Also, a very accurate concentric rotation of the gear rim to the snug or interference fit is attainable in a simple manner by a simultaneous precision forming of the tooth flanks and of the interference fit surface by means of sizing presses.

Accordingly, it is an object of the present invention to provide a tooth grip belt pulley which avoids by simple means the aforementioned shortcomings and drawbacks encountered in the prior art.

Another object of the present invention resides in a toothed belt pulley of deformed sheet metal which considerably reduces the manufacturing expenditures required therefor.

A further object of the present invention resides in a tooth grip belt pulley of the type described above which permits the transmission of a large torque accompanied by a long length of life of the belt pulley without unacceptable deformation of any of its parts.

A still further object of the present invention resides in a toothed belt pulley of deformed sheet metal in which a very accurate true running of the gear rim to the interference seat can be obtained by simple means.

These and other objects, features and advantages of the present invention will become more apparent from the following description when taken in connection with the accompanying drawing which shows, for purposes of illustration only, several embodiments in accordance with the present invention and wherein:

FIG. 1 is an axial cross-sectional view through a tooth grip belt pulley in accordance with the present invention consisting of two deformed sheet metal parts, in which the interference seat of the hub and the toothed rim are formed-on at a sheet metal part and the second sheet-metal part serves as reinforcing part;

FIG. 2 is an end elevational view of the tooth grip belt pulley according to FIG. 1;

FIG. 3 is an axial cross-sectional view through a modified embodiment of a tooth grip belt pulley corresponding to FIGS. 1 and 2, in which the reinforcing part is additionally connected with the other sheet-metal part within the area of a radial web; and FIG. 4 is an axial cross-sectional view through a still further modified embodiment of a tooth grip belt pulley according to the present invention corresponding to FIGS. 1 to 3, in which the toothed rim is formed-on at the one sheet-metal part and the interference seat of the hub is formed-on at the other sheet-metal part.

Referring now to the drawing wherein like reference numerals are used throughout the various views to designate like parts, a tooth grip belt pulley generally designated by reference numeral 1 according to FIGS. 1 and 2 consists of two approximately pot-shaped sheet metal parts generally designated by reference numerals 2 and 3 which are deformed to different depths, and of which the one sheet metal part 3 is arranged in the other sheet metal part 2. Both sheet metal parts 2 and 3 are areally connected with each other by soldering within the area of the toothed rim 4 axially externally formed-on at the sheet metal part 2 and within the area of a radial bottom wall 5 of a pot-shaped hub generally designated by reference numeral 6 also formed-on at the sheet metal part 2. Radial web ring zones 8 and 9 and a conical web ring zone 10 are formed-on in the sheet metal part 2 between a cylindrical snug or interference seat 7 of the hub 6 and the toothed rim 4 of the sheet metal part 2. An axial ring 11 is formed-on externally in the sheet metal part 3, which abuts internally at the toothed rim 4 of the sheet metal part 2 and is soldered thereto. The ring 11 of the sheet metal part 3 is connected by way of one conical and one radial web ring zone 12 and 13 each with a concentrically formed-on, circularly shaped depression 14 which is fitted to the bottom wall 5 of the hub 6 of the sheet metal part 2 and is soldered thereto areally abutting thereat. As a result of this construction of the two sheet metal parts 2 and 3, the hub 6 consisting of the bottom wall 5 and of the interference seat 7 has a rigid connection approximately box-shaped in cross section with the toothed rim 4 by way of the radial and conical web ring zones 8, 9, 10, 12 and 13, which is additionally stabilized by the connecting surfaces having large areas. As a result of this construction, the tooth grip belt pulley 1 can transmit high torques and forces from the toothed rim 4 onto a shaft to be connected with the hub 6 with a high accuracy in true or concentric running, with a slight deformation and with a long length of life.

The tooth grip belt pulley generally designated by reference numeral 101 according to FIG. 3 corresponds in its basic construction to that according to FIGS. 1 and 2. Also with this tooth grip belt pulley, two pot-shaped sheet metal parts generally designated by reference numerals 102 and 103 are arranged one within the other, which are soldered together areally abutting at one another within the area of a bottom wall 105 and of a depression 114 as also within the area of a toothed rim 104 and of an axial ring 111. In the construction according to FIG. 3, the sheet metal part 102 is additionally provided with an annular bulge or bead 115 at the edge of the hub 106 having the interference fit or seat 107, which is adjoined in the outward direction by a radial web ring zone 108 that is soldered together with a radial web ring zone 113 of the sheet metal part 103 areally abutting at one another. Axially oppositely directed conical web ring zones 110 and 112 then adjoin the two sheet metal parts 102 and 103 in the outward direction and a further radial web ring zone 109 adjoins the conical web ring zone 110 of the sheet metal part 102, which subsequently pass over respectively into the axial toothed rim 104 and into the axial ring 111. The sheet metal part 103 is thereby exclusively a reinforcing part and has also a considerably greater wall thickness than the sheet metal part 102. Since the sheet metal part 103 has considerably lesser deformations, the larger wall thickness thereof poses no deformation problem, whereas together with the connecting places with the sheet metal part 102 which include relatively large areas, a high form-rigidity of the connections between the hub 106 formed-on at the relatively thin-walled sheet metal part 102 and the toothed rim 104 also formed-on at the sheet metal part 102 results therefrom. This construction is suited in particular for tooth grip belt pulleys of relatively large diameter, as are used in particular for the drive of cam shafts of internal combustion engines.

A tooth grip belt pulley generally designated by reference numeral 201 according to FIG. 4 corresponds far-reachingly to those according to FIGS. 1, 2 and 3. In the embodiment of FIG. 4, the pot-shaped hub generally designated by reference numeral 206 is formed-on at the sheet metal part generally designated by reference numeral 203 and the toothed rim 204 is formed-on at the other sheet metal part 202. The sheet metal part 202 with the formed-on toothed rim 204 has, in this case, a circularly shaped flat depression 214 for the areal accommodation of the bottom wall 205 of the hub generally designated by reference numeral 206 of the other sheet metal part 203. An annular bead or bulge 215 adjoins the edge of the hub 206 having the interference fit 207, which annular bead passes over directly into a conical web ring zone 212 of the sheet metal part 203 that again passes over into a radial web ring zone 213 and at its outer edge into an axial ring 211 as connecting flange with the toothed rim 204 of the other sheet metal part 202. A relatively flat annular bead or bulge 216 adjoins the other sheet metal part 202 at the outer edge of the depression 214, which annular bead again passes over into a conical web ring zone 210 up to the end face of the sheet metal part 202 having a radial web ring zone 209 which is adjoined by the axial toothed rim 204. The conical web ring zones 210 and 212 of the two sheet metal parts abut directly at one another and are soldered together as also the bottom wall 205 of the hub 206 with the depression 214 and the toothed rim 204 with the axial ring 211. The two inwardly disposed annular beads 215 and 216 and the outer web ring zones 209, 210 and 213 with the toothed rim 204 form each approximately box-shaped, very rigid hollow spaces, whence also with this construction a transmission of high torques and forces is attainable with slight space requirements and low manufacturing expenditures as well as with high dimensional accuracies and with a very low weight of the tooth grip belt pulley.

The hub construction according to the present invention on a tooth grip belt pulley can be applied advantageously also to similar machine elements such as to flat belt pulleys and V-belt pulleys as well as to gears and chain sprockets.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

I claim:

1. A belt pulley of deformed sheet metal comprising a pulley rim, hub means axially positioned for receiving a shaft end and web means extending essentially radially between said pulley rim and said hub means, said pulley rim, hub means and web means being formed from one piece of sheet metal characterized in that the hub means is constructed pot-shaped and includes a cylindrical wall constructed as interference seat for a shaft end and a bottom wall constructed as axial abutment for the shaft end, the edge of the hub means passing over into the web means of the pulley, and characterized in that the bottom wall of the hub means is constructed double-walled of two sheet metal parts, in that one sheet metal part extends up to areal connecting places of the other sheet metal part, and in that the two sheet metal parts are non-detachably connected with each other at the bottom of the hub means as also at said connecting places.

2. A pulley according to claim 1, characterized in that at least one of the connecting places is within the area of the web means of the other sheet metal part.

3. A pulley according to claim 2, characterized in that at least one of the connecting places is located within the area of the inside of the rim of the other sheet metal part.

4. A pulley according to claim 1, characterized in that at least one of the connecting places is located within the area of the inside of the rim of the other sheet metal part.

5. A pulley according to claim 3, characterized in that one of the sheet metal parts is provided with a depression accommodating the bottom wall of the hub means of the other sheet metal part.

6. A pulley according to claim 3, characterized in that the edge of the hub means includes an annular bead means.

7. A pulley according to claim 6, characterized in that one sheet metal part is connected with the outer edge of the annular bead means of the other sheet metal part.

8. A pulley according to claim 7, characterized in that the one sheet metal part forms exclusively a reinforcing part.

9. A pulley according to claim 8, characterized in that the one of the two sheet metal parts has a considerably larger wall thickness than the other sheet metal parts forming the hub means and the toothed rim.

10. A pulley according to claim 9, characterized in that the pulley is a tooth grip pulley.

11. A pulley according to claim 1, characterized in that one of the sheet metal parts is provided with a depression accommodating the bottom wall of the hub means of the other sheet metal part.

12. A pulley according to claim 1, characterized in that the one sheet metal part forms exclusively a reinforcing part.

13. A pulley according to claim 1, characterized in that the one of the two sheet metal parts has a considerably larger wall thickness than the other sheet metal parts forming the hub means and the toothed rim.

* * * * *